United States Patent
Madhavan et al.

(10) Patent No.: US 9,121,962 B2
(45) Date of Patent: *Sep. 1, 2015

(54) METHOD AND CONDUIT FOR TRANSMITTING SIGNALS

(71) Applicant: Intelliserv, LLC, Houston, TX (US)

(72) Inventors: Raghu Madhavan, Houston, TX (US); Bruce W. Boyle, Sugar Land, TX (US); Brian Clark, Sugar Land, TX (US)

(73) Assignee: Intelliserv, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/731,829

(22) Filed: Dec. 31, 2012

(65) Prior Publication Data

US 2013/0127632 A1 May 23, 2013

Related U.S. Application Data

(62) Division of application No. 12/172,484, filed on Jul. 14, 2008, now Pat. No. 8,344,905, which is a division of application No. 10/907,419, filed on Mar. 31, 2005, now Pat. No. 7,413,021.

(51) Int. Cl.
*E21B 19/16* (2006.01)
*G01V 3/18* (2006.01)
*G01V 11/00* (2006.01)
*H01R 43/00* (2006.01)

(52) U.S. Cl.
CPC .............. *G01V 3/18* (2013.01); *G01V 11/002* (2013.01); *H01R 43/00* (2013.01); *Y10T 29/49117* (2015.01)

(58) Field of Classification Search
CPC ....... E21B 17/02; E21B 17/028; E21B 19/16; E21B 47/12; G01V 11/002

USPC ............ 166/35.1, 242.1; 175/320; 340/854.4, 340/855.1

See application file for complete search history.

(56) References Cited

U.S. PATENT DOCUMENTS 3,518,608 A * 6/1970 Papadopoulos ............... 439/191
4,297,880 A 11/1981 Berger
(Continued)

FOREIGN PATENT DOCUMENTS

EA 007962 B1 2/2007
WO 2007016687 A1 2/2007

OTHER PUBLICATIONS

Sperry Drilling Services, "PWD (Pressure White Drilling) Sensor", Aug. 2007 (2 pages).

(Continued)

*Primary Examiner* — Catherine Loikith
(74) *Attorney, Agent, or Firm* — Conley Rose, P.C.

(57) ABSTRACT

A method for making a conduit for transmitting signals along its length includes forming one or more grooves in at least one of the inner and outer walls of a tubular body that extend substantially to a communicative coupler, and securing one or more conductive wires within the one or more grooves. A conduit for transmitting signals along its length in a borehole environment includes one or more conductive wires extending through and being secured within one or more grooves of a tubular body, the one or more conductive wires in signal communication with a communicative coupler so as to establish one or more wired links. The conduit may include a means for securing the one or more conductive wires within the one or more grooves.

6 Claims, 11 Drawing Sheets

(56) References Cited

U.S. PATENT DOCUMENTS

| | | |
|---|---|---|
| 4,606,415 A | 8/1986 | Gray, Jr. et al. |
| 5,184,508 A | 2/1993 | Desbrandes |
| 5,469,736 A | 11/1995 | Moake |
| 5,887,657 A | 3/1999 | Bussear et al. |
| 5,934,371 A | 8/1999 | Bussear et al. |
| 5,959,547 A | 9/1999 | Tubel et al. |
| 6,233,524 B1 | 5/2001 | Harrell et al. |
| 6,252,518 B1 | 6/2001 | Laborda |
| 6,374,913 B1 | 4/2002 | Robbins et al. |
| 6,415,231 B1 | 7/2002 | Hebert |
| 6,415,877 B1 | 7/2002 | Fincher et al. |
| 6,615,933 B1 | 9/2003 | Eddison |
| 6,641,434 B2 * | 11/2003 | Boyle et al. .................... 439/577 |
| 6,648,081 B2 | 11/2003 | Fincher et al. |
| 6,648,082 B2 | 11/2003 | Schultz et al. |
| 6,659,197 B2 | 12/2003 | Cooper |
| 6,670,880 B1 | 12/2003 | Hall et al. |
| 6,712,160 B1 | 3/2004 | Schultz et al. |
| 6,717,501 B2 | 4/2004 | Hall et al. |
| 6,722,450 B2 | 4/2004 | Schultz |
| 6,725,162 B2 | 4/2004 | Edwards et al. |
| 6,732,052 B2 | 5/2004 | MacDonald |
| 6,821,147 B1 | 11/2004 | Hall et al. |
| 6,830,467 B2 | 12/2004 | Hall et al. |
| 6,844,498 B2 | 1/2005 | Hall et al. |
| 6,854,532 B2 | 2/2005 | Fincher et al. |
| 6,868,920 B2 | 3/2005 | Holeit et al. |
| 6,888,473 B1 | 5/2005 | Hall et al. |
| 6,986,282 B2 | 1/2006 | Cigienec et al. |
| 7,044,237 B2 | 5/2006 | Leuchtenberg |
| 7,062,959 B2 | 6/2006 | Kurkjian et al. |
| 7,082,821 B2 | 8/2006 | Chen et al. |
| 7,139,218 B2 | 11/2006 | Hall et al. |
| 7,174,975 B2 | 2/2007 | Krueger et al. |
| 7,201,221 B2 | 4/2007 | Tubel et al. |
| 7,207,396 B2 | 4/2007 | Hall et al. |
| 7,270,185 B2 | 9/2007 | Fontana et al. |
| 7,284,903 B2 | 10/2007 | Hartog |
| 7,311,142 B2 | 12/2007 | Fisseier et al. |
| 8,344,905 B2 * | 1/2013 | Madhavan et al. ......... 340/855.1 |
| 2004/0039466 A1 | 2/2004 | Lilly et al. |
| 2004/0104797 A1 | 6/2004 | Hall et al. |
| 2004/0113808 A1 | 6/2004 | Hall et al. |
| 2004/0145492 A1 | 7/2004 | Hall et al. |
| 2004/0150532 A1 | 8/2004 | Hall et al. |
| 2004/0206511 A1 * | 10/2004 | Tilton et al. .................... 166/380 |
| 2005/0001735 A1 | 1/2005 | Hall et al. |
| 2005/0092488 A1 | 5/2005 | Rodet et al. |
| 2005/0092499 A1 | 5/2005 | Hall et al. |
| 2005/0161215 A1 | 7/2005 | Hall et al. |
| 2005/0173128 A1 | 8/2005 | Hall et al. |
| 2005/0194182 A1 | 9/2005 | Rodney et al. |
| 2005/0194184 A1 | 9/2005 | Gleitman |
| 2005/0200498 A1 | 9/2005 | Gleitman |
| 2005/0284663 A1 | 12/2005 | Hall et al. |
| 2006/0065402 A9 | 3/2006 | Fontana et al. |
| 2006/0157282 A1 | 7/2006 | Tilton et al. |
| 2007/0017671 A1 | 1/2007 | Clark et al. |
| 2007/0029112 A1 | 2/2007 | Li et al. |
| 2007/0030167 A1 | 2/2007 | Li et al. |
| 2007/0045006 A1 | 3/2007 | Krueger et al. |
| 2007/0188344 A1 | 8/2007 | Hache et al. |
| 2007/0263488 A1 | 11/2007 | Clark |
| 2007/0272033 A9 | 11/2007 | Jones |
| 2008/0041576 A1 | 2/2008 | Patel |
| 2008/0135291 A1 | 6/2008 | Hall et al. |

OTHER PUBLICATIONS

Petrobras Emerging Well Technologies; by Placido, Joao Carlos Ribeiro, et al., Drilling & Well Technology, Oil & Gas Review, 2007 OTC Edition (4 pages).

IADE/SPE 112636; High Speed Telemetry Drill Pipe Network Optimizes Drilling Dynamics and Wellbore Placement, Ali, T. H., et al., 200B (8 pages).

IADE/SPE 112702. The Utilization of the Massive Amount of Real Time Data Acquired in Wired Drillpipe Operations, Olberg, et al., (13 pages), (Copyright 2008.).

IADC/SPE 115206, Evolution of Innovative Test Methodology for Evaluation or Hardfacing Materials in both Cased and Open Environments; Chan, Alvaro, et al., SPE International, 2008 (15 pages).

IADC/SPE 112740 Evolution of Drilling Programs and Complex Well Profiles Drive Development of Fourth-Generation Hardband Technology, Chan, Alvaro, et al 2008 (17 pages).

Russian Patent Application No. 2010137427 Office Action dated Nov. 19, 2012.

* cited by examiner

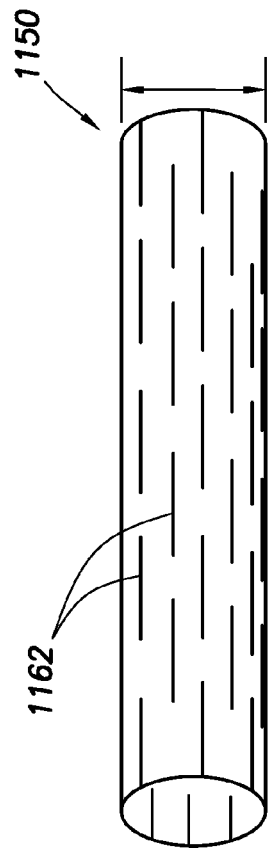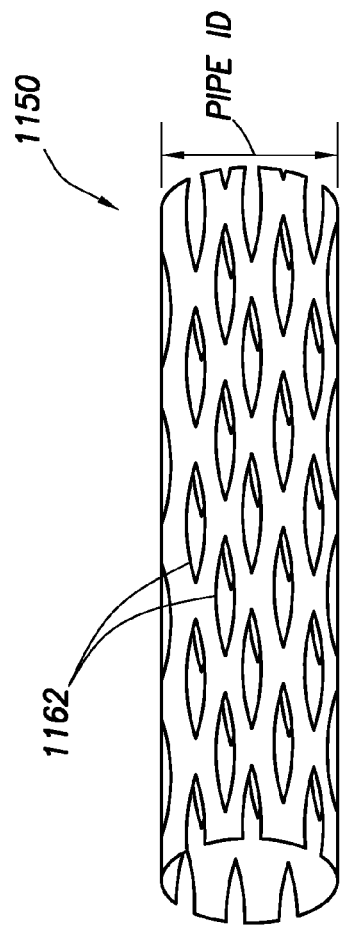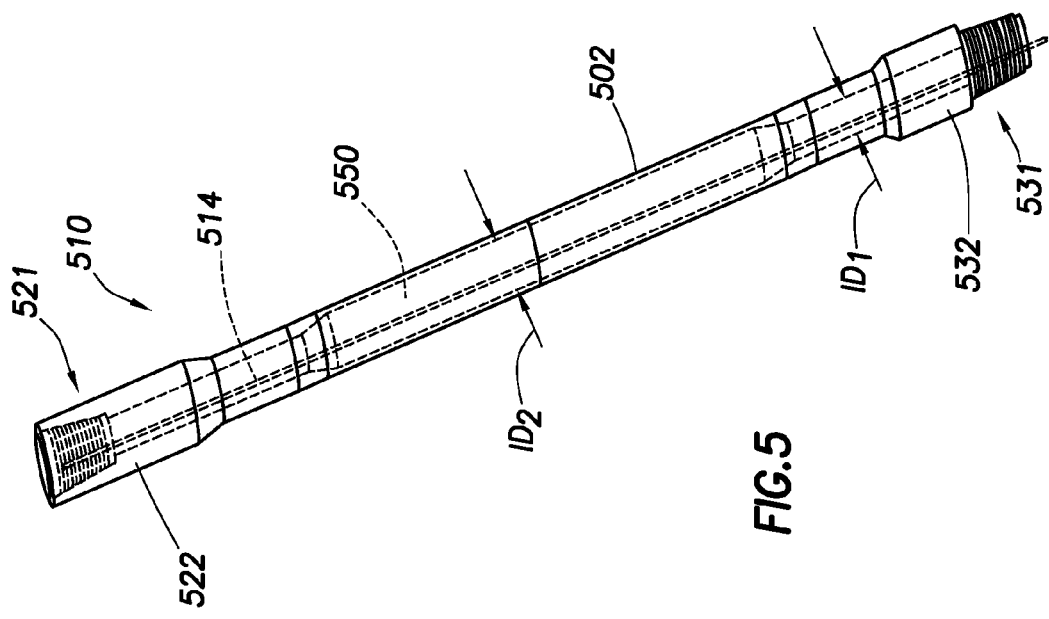

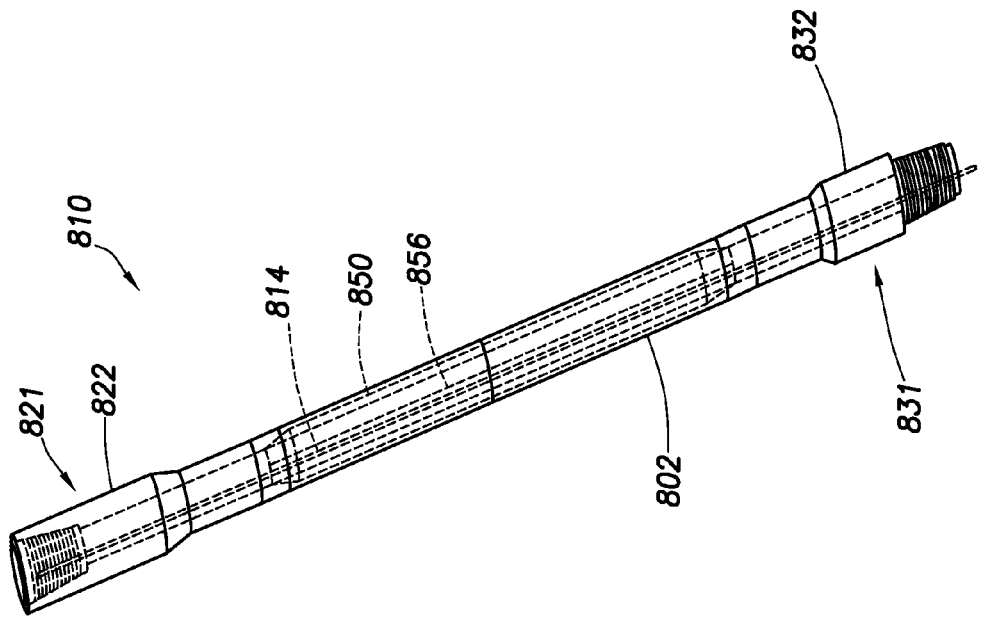
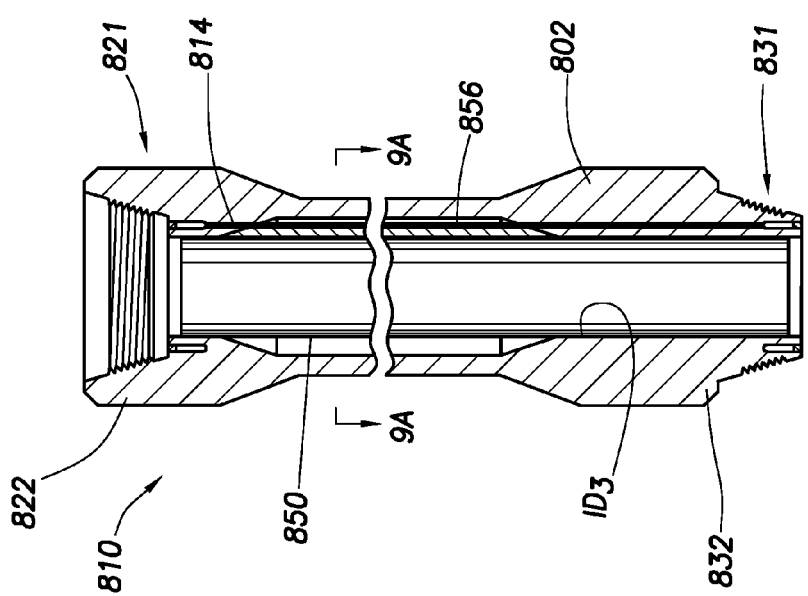

METHOD AND CONDUIT FOR TRANSMITTING SIGNALS

CROSS-REFERENCE TO RELATED APPLICATIONS

This application is a divisional of U.S. patent application No. 12/172,484, filed Jul. 14, 2008, entitled "Method and Conduit For Transmitting Signals", which is a divisional of U.S. patent application Ser. No. 10/907,419 filed Mar. 31, 2005, entitled "Method and Conduit For Transmitting Signals", and now patented as U.S. Pat. No. 7,413,021 on Aug. 19, 2008.

STATEMENT REGARDING FEDERALLY SPONSORED RESEARCH OR DEVELOPMENT

Not applicable.

BACKGROUND

The present invention relates to downhole telemetry systems, and more particularly to wired conduit such as drill pipe that is adapted for conveying data and/or power between one or more downhole locations within a borehole and the surface.

Measurement While Drilling (MWD) and Logging While Drilling (LWD) systems derive much of their value from the ability to provide real-time information about downhole conditions near the drill bit. Oil companies use these downhole measurements to make decisions during the drilling process, e.g., to provide input or feedback information for sophisticated drilling techniques such as the GeoSteering system developed by Schlumberger. Such techniques rely heavily on instantaneous knowledge of the formation that is being drilled. Accordingly, the industry continues to develop new real-time (or near real-time) measurements for MWD/LWD, including imaging-type measurements with high data content.

Such new measurements and the related control systems require telemetry systems having higher data transmission rates than those currently available. As a result, a number of new and/or modified telemetry techniques for use with MWD/LWD systems have been proposed or tried with varying degrees of success.

The conventional industry standard for data transmission between downhole and surface locations is mud-pulse telemetry wherein the drill string is used to convey modulated acoustic waves in the drilling fluid. Data transmission rates using mud-pulse telemetry lie in the range of 1-6 bits/second. Such slow rates are incapable of transmitting the large amounts of data that are typically gathered with an LWD string. Additionally, in some cases (e.g., when using foamed drilling fluid), mud-pulse telemetry does not work at all. As a result, it is not uncommon for some or all of the data collected by MWD/LWD systems to be stored in downhole memory and downloaded at the end of a bit run. This delay significantly reduces the value of the data for real-time or near real-time applications. Also, there is a significant risk of data loss, for example, if the MWD/LWD tool(s) are lost in the borehole.

Electromagnetic (EM) telemetry via subsurface earth pathways has been tried with limited success. The utility of EM telemetry is also depth-limited, depending on the resistivity of the earth, even at low data transmission rates.

Acoustic telemetry through the drill pipe itself has been studied extensively but has not been used commercially to date. In theory, data transmission rates in the 10's of bits/second should be possible using acoustic waves conveyed through the steel drill string, but this has not been reliably proven.

The concept of routing a wire in interconnected drill pipe joints has been proposed numerous times over the past 25 years. Some of the prior proposals are disclosed in: U.S. Pat. No. 4,126,848 by Denison; U.S. Pat. No. 3,957,118 by Barry et al.; and U.S. Pat. No. 3,807,502 by Heilhecker et al.; and in publications such as "Four Different Systems Used for MWD", W. J. McDonald, The Oil and Gas Journal, pages 115-124, Apr. 3, 1978.

A number of more recent patents and publication have focused on the use of current-coupled inductive couplers in wired drill pipe (WDP). U.S. Pat. No. 4,605,268 by Meador describes the use and basic operation of current-coupled inductive couplers mounted at the sealing faces of drill pipes. Russian Federation published Patent Application No. 2140537 by Basarygin et al., and an earlier Russian Federation published Patent Application No. 2040691 by Konovalov et al., both describe a drill pipe telemetry system that uses current-coupled inductive couplers mounted proximate to the sealing faces of drill pipes. International Publication No. WO 90/14497 A2 by Jurgens et al. describes an inductive coupler mounted at the ID of the drill pipe joint for data transfer. Other relevant patents include the following U.S. Pat. No. 5,052,941 by Hernandez-Marti et al.; U.S. Pat. No. 4,806,928 by Veneruso; U.S. Pat. No. 4,901,069 by Veneruso; U.S. Pat. No. 5,531,592 by Veneruso; U.S. Pat. No. 5,278,550 by Rhein-Knudsen, et al.; U.S. Pat. No. 5,971,072 by Huber et al.; and U.S. Pat. No. 6,641,434 by Boyle et al.

The above references are generally focused on the transmission of data across the coupled ends of interconnected drill pipe joints, rather than along the axial lengths of the pipe joints. A number of other patent references have disclosed or suggested particular solutions for data transmission along the axial lengths of downhole conduit or pipe joints, including: U.S. Pat. No. 2,000,716 by Polk; U.S. Pat. No. 2,096,359 by Hawthorn; U.S. Pat. No. 4,095,865 by Denison et al.; U.S. Pat. No. 4,72,402 by Weldon; U.S. Pat. No. 4,953,636 by Mohn; U.S. Pat. No. 6,392,317 by Hall et al.; and U.S. Pat. No. 6,799,632 by Hall et al. Other relevant patent references include International Publication No. WO 2004/033847 A1 by Williams et al., International Publication No. WO 0206716 A1 by Hall et al., and U.S. Publication No. US 2004/0119607 A1 by Davies et al.

DEFINITIONS

Certain terms are defined throughout this description as they are first used, while certain other terms used in this description are defined below.

"Communicative" means capable of conducting or carrying a signal.

"Communicative coupler" means a device or structure that serves to connect the respective ends of two adjacent tubular members, such as the threaded box/pin ends of adjacent pipe joints, through which a signal may be conducted.

"Communication link" means a plurality of communicatively-connected tubular members, such as interconnected WDP joints for conducting signals over a distance.

"Telemetry system" means at least one communication link plus other components such as a surface computer, MWD/LWD tools, communication subs, and/or routers, required for the measurement, transmission, and indication/recordation of data acquired from or through a borehole.

"Wired link" means a pathway that is at least partially wired along or through a WDP joint for conducting signals.

"Wired drill pipe" or "WDP" means one or more tubular members—including drill pipe, drill collars, casing, tubing and other conduit—that are adapted for use in a drill string, with each tubular member comprising a wired link. Wired drill pipe may comprise a liner or lining, and may be expandable, among other variations.

SUMMARY

The present invention relates to the transmission of data along the axial length of conduit or pipe joints adapted for use in downhole operations such as drilling. Accordingly, in one aspect, the present invention provides a method for making a conduit for transmitting signals along its length. The inventive method includes the steps of equipping a tubular body with a communicative coupler at or near each of the two ends of the tubular body, and positioning an expandable tubular sleeve within the tubular body. The sleeve has a portion that is predisposed to initiate expansion thereof under the application of internal fluid pressure. One or more conductive wires are extended between the inner wall of the tubular body and the tubular sleeve, and the one or more wires are connected between the communicative couplers so as to establish a wired link. The tubular sleeve is expanded within the tubular body by applying fluid pressure to the inner wall of the tubular sleeve. In this manner, the conductive wire(s) are secured between the tubular body and the tubular sleeve.

In particular embodiments of the inventive method, the predisposed portion of the tubular sleeve is preformed (i.e., formed prior to positioning the tubular sleeve within the tubular body) by: localized application of mechanical force to the inner wall of the tubular sleeve; localized application of mechanical force to the outer wall of the tubular sleeve; modifying the material properties of a portion of the tubular sleeve; or a combination of these. The predisposed portion of the tubular sleeve may be defined in other ways, such as by: reducing the wall thickness of a portion of the tubular sleeve; reinforcing the tubular sleeve except at a portion thereof; or a combination of these.

In another aspect, the present invention provides a method that employs pad(s) for making a conduit for transmitting signals along its length. The method includes the steps of equipping a tubular body with a communicative coupler at or near each of the two ends of the tubular body, and positioning an elongated pad at or near an inner wall of the tubular body. One or more conductive wires are extended along the pad such that the one or more wires are disposed between the inner wall of the tubular body and at least a portion of the pad, and the one or more wires are connected between the communicative couplers so as to establish a wired link. The elongated pad is secured to the tubular body. In this manner, the conductive wire(s) are secured between the tubular body and the pad.

In a particular embodiment of the inventive pad-employing method, the pad-securing step includes the steps of positioning an expandable tubular sleeve within the tubular body such that the pad is disposed between the tubular body and the expandable sleeve, and expanding the expandable sleeve into engagement with the tubular body, whereby the pad is secured between the expandable sleeve and the tubular body. The expandable tubular sleeve may exhibit different shapes, such as being cylindrical or having a substantially U-shaped cross-section, when it is positioned within the tubular body. Additionally, the expandable tubular sleeve may have a plurality of axially-oriented slots therein to facilitate expansion of the sleeve.

The sleeve-expanding step may include applying fluid pressure to the inner wall of the tubular sleeve, mechanically applying force to the inner wall of the tubular sleeve, or a combination of these steps. Additionally, the sleeve-expanding step may include detonating an explosive within the tubular sleeve so as to apply an explosive force to the inner wall of the tubular sleeve.

In further embodiments of the inventive pad-employing method, the pad-securing step includes the step of cutting a tubular sleeve along its length, with the tubular sleeve having a diameter before such cutting that prevents it from fitting within the tubular body. A compressive force is applied to the cut tubular sleeve to radially collapse the tubular sleeve so that it will fit within the tubular body. While the tubular sleeve is maintained in the collapsed state, it is positioned within the tubular body such that the elongated pad is positioned between the tubular body and the tubular sleeve. The tubular sleeve is then released from its collapsed state so that the tubular sleeve radially expands into engagement with the elongated pad and the tubular body.

In particular embodiments of the inventive pad-employing method wherein the pad is metallic, the pad-securing step includes welding the pad to the inner wall of the tubular body at one or more locations therealong.

In further embodiments of the inventive pad-employing method wherein the pad is fiberglass, the pad-securing step includes bonding the pad to the inner wall of the tubular body. Additionally, the one or more conductive wires may be bonded to the inner wall of the tubular body.

In particular embodiments of the inventive pad-employing method, the tubular body is a drill pipe joint having a box end and a pin end each equipped with a communicative coupler. In such embodiments, the wire-connecting step may include the steps of forming openings in the pin and box ends of the drill pipe joint that extend from the respective communicative couplers to the inner wall of the drill pipe, and extending the one or more conductive wires through the openings.

In particular embodiments of the inventive pad-employing method, the shape of the pad substantially defines a cylindrical segment having an outer arcuate surface that complements the inner wall of the tubular body. An elongated groove may be formed in the outer arcuate surface of the pad for receiving the one or more conductive wires.

In particular embodiments of the inventive pad-employing method, the pad is one of metallic, polymeric, composite, fiberglass, ceramic, or a combination thereof In another aspect, the present invention provides a method that employs grooves for making a conduit for transmitting signals along its length. The method includes the step of equipping a tubular body with a communicative coupler at or near each of the two ends of the tubular body. One or more grooves are formed in at least one of the inner and outer walls of the tubular body that extend substantially between the communicative couplers. One or more conductive wires are extended through the one or more grooves. The one or more wires are connected between the communicative couplers so as to establish one or more wired links. The one or more wires are secured within the one or more inner grooves.

In particular embodiments of the inventive groove-employing method, the one or more grooves are formed in the inner wall of the tubular body. In such embodiments, the wire-securing step may include bonding the one or more wires within the one or more grooves. The wire-securing step may otherwise include covering the one or more grooves, such as by applying a polymeric coating about the inner wall of the tubular body. The groove-covering step may otherwise include securing one or more plates to the inner wall of the tubular body so as to cover each of the one or more grooves independently. The wire-securing step may otherwise include extending the one or more wires through one or more second conduits each bonded to one of the grooves, with each second conduit being shaped and oriented so that it extends substantially between the communicative couplers.

In particular embodiments of the inventive groove-employing method, the one or more grooves are formed in the outer wall of the tubular body. In such embodiments, the wire-securing step may include bonding the one or more wires within the one or more grooves. The wire-securing step may otherwise include covering the one or more grooves, such as by securing a sleeve about the outer wall of the tubular body. Such a sleeve may be one of metallic, polymeric, composite, fiberglass, ceramic or a combination thereof.

In another aspect, the present invention provides an expandable tubular sleeve for lining a downhole tubular member, including a tubular body having a portion that is predisposed to initiate expansion thereof under the application of internal fluid pressure. The predisposed portion of the body may be a plastically-deformed portion formed, e.g., by localized application of mechanical force to an inner or outer wall of the body. The predisposed portion of the body may otherwise be defined by a portion of the body having reduced wall thickness. The reduced wall thickness may be achieved, e.g., by reinforcing the wall thickness everywhere except the predisposed portion. The predisposed portion of the body may otherwise be formed by modifying the material properties of a portion of the body, e.g., by localized heat treatment.

In another aspect, the present invention provides a conduit for transmitting signals along its length in a borehole environment, including a tubular body equipped with a communicative coupler at or near each of its two ends. Each of the communicative couplers includes a coil having two or more independent coil windings, with each coil winding lying substantially within a discrete arc of the coil. Two or more conductors extend independently along or through the wall of the tubular body and are connected between the respective coil windings so as to establish two or more independently-wired links. Each conductor includes one or more conductive wires.

In particular embodiments of the inventive conduit, the coil of each communicative coupler has two independent coil windings, and each winding lies substantially within a discrete 180.degree. arc of the coil.

In a further aspect, the present invention provides a method for transmitting signals along the length of a tubular body. The tubular body is equipped with a communicative coupler at or near each of its two ends, with each of the communicative couplers comprising a coil having two or more independent coil windings. Two or more conductors are extended independently along or through the wall of the tubular body, and the independent conductors are connected between the respective independent coil windings so as to establish two or more independently-wired links. Accordingly, wired communication may be maintained when a failure occurs in one (or possibly more) of the wired links.

In another aspect, the present invention provides a conduit that employs a pad for transmitting signals along its length in a borehole environment. The conduit includes a tubular body equipped with a communicative coupler at or near each of its two ends, and an elongated pad secured along an inner wall of the tubular body. One or more conductive wires extend along the pad such that the one or more wires are disposed between the inner wall of the tubular body and at least a portion of the pad, and the one or more wires are connected between the communicative couplers so as to establish a wired link. The elongated pad may be secured by a tubular sleeve expanded within the tubular body.

In another aspect, the present invention provides a conduit that employs grooves for transmitting signals along its length in a borehole environment, including a tubular body equipped with a communicative coupler at or near each of its two ends. The tubular body has one or more grooves in at least one of the inner and outer walls thereof that extend substantially between the communicative couplers. One or more conductive wires extend through and are secured within the one or more grooves. The one or more wires are connected between the communicative couplers so as to establish one or more wired links.

In another aspect, the present invention provides a system of interconnected conduits for transmitting signals in a borehole environment. Each of the conduits includes a tubular body equipped with a communicative coupler at or near each of the two ends of the tubular body, with the communicative couplers permitting signals to be transmitted between adjacent, interconnected conduits. An elongated pad is positioned along an inner wall of the tubular body, and one or more conductive wires extend along the pad such that the one or more wires are disposed between the inner wall of the tubular body and at least a portion of the pad. The one or more wires are connected between the communicative couplers so as to establish a wired link. A tubular sleeve is expanded within the tubular body such the pad is secured between the tubular body and the expandable sleeve.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

FIG. 5 illustrates a conduit similar to that shown in FIG. 2, but employing an expandable tubular sleeve for securing and protecting one or more conductive wires between a pair of communicative couplers in accordance with the present invention.

FIG. 8A is a sectional illustration of a conduit similar to that shown in FIG. 5, but employing an elongated pad in combination with an expandable tubular sleeve for securing and protecting one or more conductive wires in accordance with the present invention.

FIG. 8B is a perspective illustration of the conduit of FIG. 8A, after the expandable tubular sleeve has been expanded into engagement with the elongated pad and the inner wall of the conduit.

FIG. 11A shows one embodiment of an expandable tubular sleeve according to the present invention that is equipped with axially-oriented slots to facilitate expansion thereof.

FIG. 11B shows the sleeve of FIG. 11A after expansion thereof

DETAILED DESCRIPTION OF THE INVENTION

Figure 1:
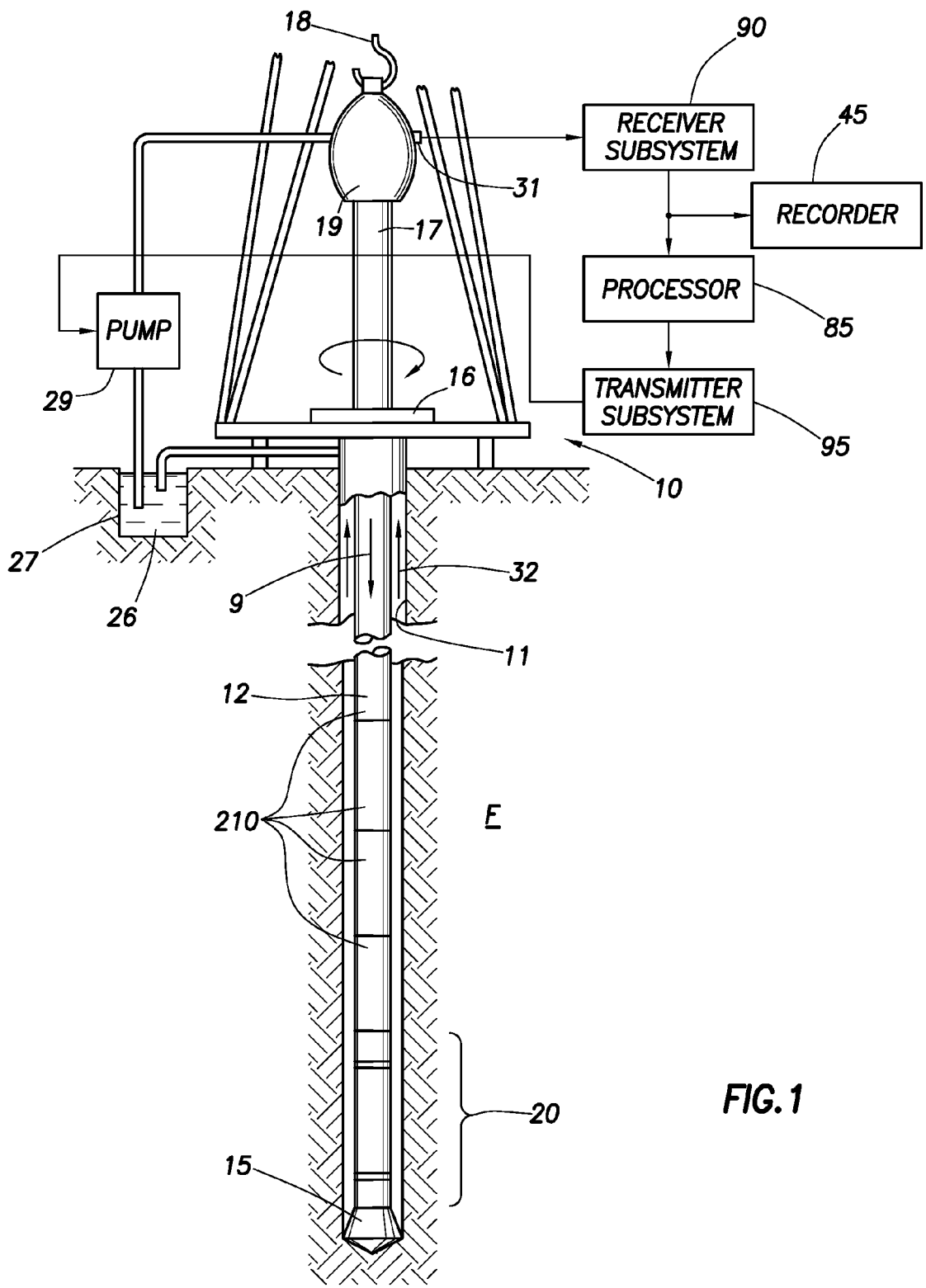
FIG. 1 is an elevational illustration of a drill string assembly with which the present invention may be employed to advantage.

FIG. 1 illustrates a conventional drilling rig and drill string in which the present invention can be utilized to advantage. As shown in FIG. 1, a platform and derrick assembly 10 is positioned over a borehole 11 penetrating a subsurface formation F. A drill string 12 is suspended within the borehole 11 and includes a drill bit 15 at its lower end. The drill string 12 is rotated by a rotary table 16, energized by means not shown, which engages a kelly 17 at the upper end of the drill string. The drill string 12 is suspended from a hook 18, attached to a traveling block (not shown), through the kelly 17 and a rotary swivel 19 which permits rotation of the drill string relative to the hook.

Drilling fluid or mud 26 is stored in a pit 27 formed at the well site. A mud pump 29 delivers drilling fluid 26 to the interior of the drill string 12 via a port (not numbered) in the swivel 19, inducing the drilling fluid to flow downwardly through the drill string 12 as indicated by directional arrow 9. The drilling fluid subsequently exits the drill string 12 via ports in the drill bit 15, and then circulates upwardly through the region between the outside of the drill string and the wall of the borehole, called the annulus, as indicated by direction arrows 32. In this manner, the drilling fluid lubricates the drill bit 15 and carries formation cuttings up to the surface as the drilling fluid is returned to the pit 27 for screening and recirculation.

The drill string 12 further includes a bottom hole assembly (BHA) 20 disposed near the drill bit 15. The BHA 20 may include capabilities for measuring, processing, and storing information, as well as for communicating with the surface (e.g., with MWD/LWD tools). An example of a communications apparatus that may be used in a BHA is described in detail in U.S. Pat. No. 5,339,037.

The communication signal from the BHA may be received at the surface by a transducer 31, which is coupled to an uphole receiving subsystem 90. The output of the receiving subsystem 90 is then couple to a processor 85 and a recorder 45. The surface system may further include a transmitting system 95 for communicating with the downhole instruments. The communication link between the downhole instruments and the surface system may comprise, among other things, a drill string telemetry system that comprises a plurality of wired drill pipe (WDP) joints.

The drill string 12 may otherwise employ a "top-drive" configuration (also well known) wherein a power swivel rotates the drill string instead of a kelly joint and rotary table. Those skilled in the art will also appreciate that "sliding" drilling operations may otherwise be conducted with the use of a well known Moineau-type mud motor that converts hydraulic energy from the drilling mud 26 pumped from the mud pit 27 down through the drill string 12 into torque for rotating a drill bit. Drilling may furthermore be conducted with so-called "rotary-steerable" systems which are known in the related art. The various aspects of the present invention are adapted for employment in each of these drilling configurations and are not limited to conventional rotary drilling operations.

The drill string 12 employs a wired telemetry system wherein a plurality of WDP joints 210 are interconnected within the drill string to form a communication link (not numbered). One type of WDP joint, as disclosed in U.S. Pat. No. 6,641,434 by Boyle et al. and assigned to the assignee of the present invention, uses communicative couplers—particularly inductive couplers—to transmit signals across the WDP joints. An inductive coupler in the WDP joints, according to Boyle et al., comprises a transformer that has a toroidal core made of a high permeability, low loss material such as Supermalloy (which is a nickel-iron alloy processed for exceptionally high initial permeability and suitable for low level signal transformer applications). A winding, consisting of multiple turns of insulated wire, coils around the toroidal core to form a toroidal transformer. In one configuration, the toroidal transformer is potted in rubber or other insulating materials, and the assembled transformer is recessed into a groove located in the drill pipe connection.

Figure 4:
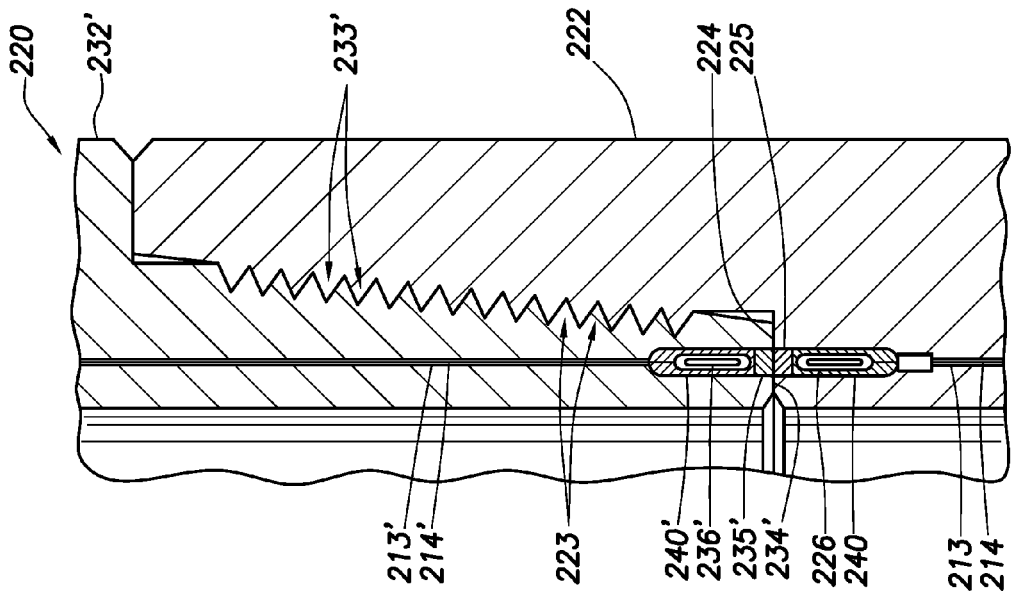
FIG. 4 is a detailed sectional illustration of the facing pair of communicative couplers of FIG. 3 locked together as part of an operational conduit string.
Figure 2:
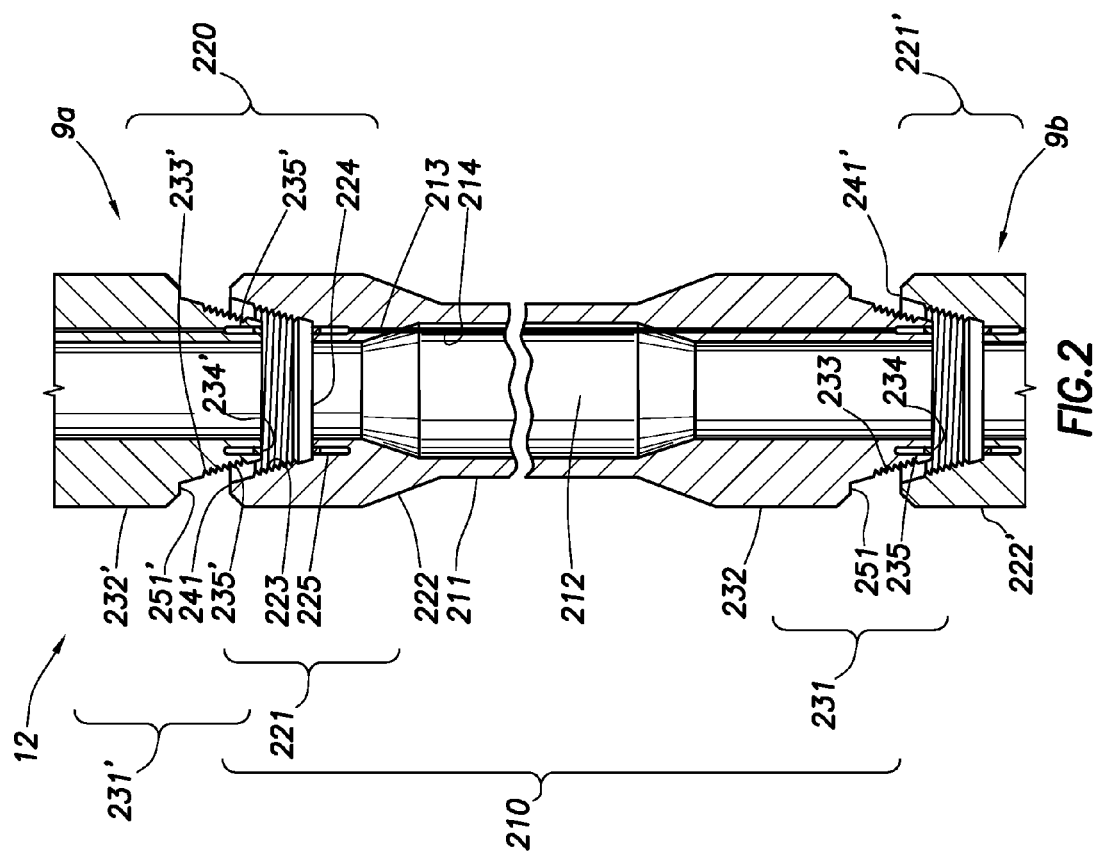
FIG. 2 is a sectional illustration of one embodiment of a wired conduit with which the present invention may be employed to advantage.
Figure 3:
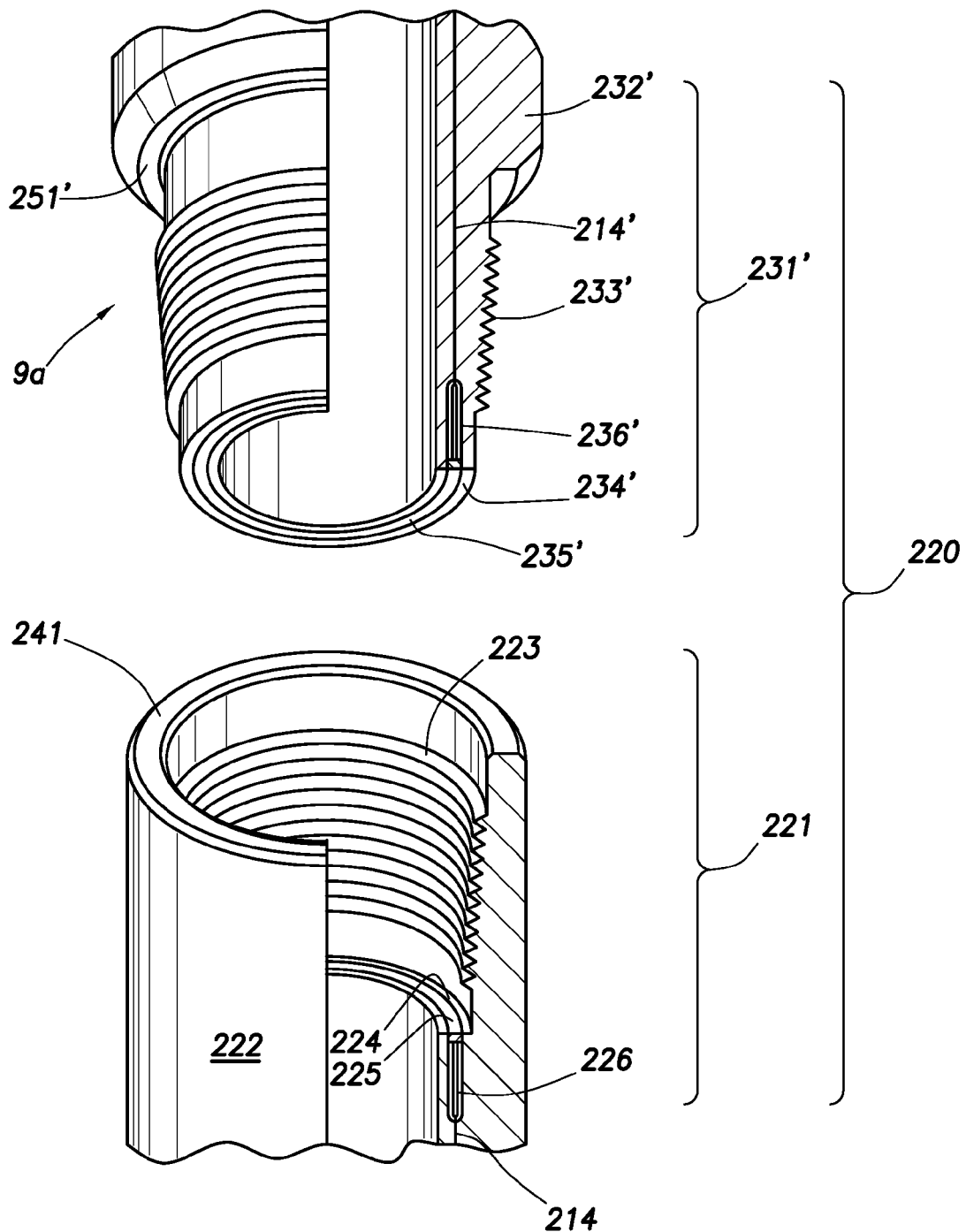
FIG. 3 is a partially cut-away, perspective illustration of a facing pair of communicative couplers according to the wired conduit of FIG. 2.

Turning now to FIGS. 2-4, a WDP joint 210 is shown to have communicative couplers 221, 231—particularly inductive coupler elements—at or near the respective end 241 of box end 222 and the end 234 of pin end 232 thereof. A first cable 214 extends through a conduit 213 to connect the communicative couplers, 221, 231 in a manner that is described further below.

The WDP joint 210 is equipped with an elongated tubular body 211 having an axial bore 212, a box end 222, a pin end 232, and a first cable 214 running from the box end 222 to the pin end 232. A first current-loop inductive coupler element 221 (e.g., a toroidal transformer) and a similar second current-loop inductive coupler element 231 are disposed at the box end 222 and the pin end 232, respectively. The first current-loop inductive coupler element 221, the second current-loop inductive coupler element 231, and the first cable 214 collectively provide a communicative conduit across the length of each WDP joint. An inductive coupler (or communicative connection) 220 at the coupled interface between two WDP joints is shown as being constituted by a first inductive coupler element 221 from WDP joint 210 and a second current-loop inductive coupler element 231' from the next tubular member, which may be another WDP joint. Those skilled in the art will recognize that, in some embodiments of the present invention, the inductive coupler elements may be replaced with other communicative couplers serving a similar communicative function, such as, e.g., direct electrical-contact connections of the sort disclosed in U.S. Pat. No. 4,126,848 by Denison.

FIG. 4 depicts the inductive coupler or communicative connection 220 of FIG. 3 in greater detail. Box end 222 includes internal threads 223 and an annular inner contacting shoulder 224 having a first slot 225, in which a first toroidal transformer 226 is disposed. The toroidal transformer 226 is connected to the cable 214. Similarly, pin-end 232' of an adjacent wired tubular member (e.g., another WDP joint) includes external threads 233' and an annular inner contacting pipe end 234' having a second slot 235', in which a second toroidal transformer 236' is disposed. The second toroidal transformer 236' is connected to a second cable 214' of the adjacent tubular member 9a. The slots 225 and 235' may be clad with a high-conductivity, low-permeability material (e.g., copper) to enhance the efficiency of the inductive coupling. When the box end 222 of one WDP joint is assembled with the pin end 232' of the adjacent tubular member (e.g., another WDP joint), a communicative connection is formed. FIG. 4 thus shows a cross section of a portion of the resulting interface, in which a facing pair of inductive coupler elements (i.e., toroidal transformers 226, 236') are locked together to form a communicative connection within an operative communication link. This cross-sectional view also shows that the closed toroidal paths 240 and 240' enclose the toroidal transformers 226 and 236', respectively, and that the conduits 213 and 213' form passages for internal electrical cables 214 and 214' that connect the two inductive coupler elements disposed at the two ends of each WDP joint.

The above-described inductive couplers incorporate an electric coupler made with a dual toroid. The dual-toroidal coupler uses inner shoulders of the pin and box ends as electrical contacts. The inner shoulders are brought into engagement under extreme pressure as the pin and box ends are made up, assuring electrical continuity between the pin and the box ends. Currents are induced in the metal of the connection by means of toroidal transformers placed in slots. At a given frequency (for example 100 kHz), these currents are confined to the surface of the slots by skin depth effects. The pin and the box ends constitute the secondary circuits of the respective transformers, and the two secondary circuits are connected back to back via the mating inner shoulder surfaces.

While FIGS. 3-5 depict certain communicative coupler types, it will be appreciated by one of skill in the art that a variety of couplers may be used for communication of a signal across interconnected tubular members. For example, such systems may involve magnetic couplers, such as those described in International Patent Application No. WO 02/06716 to Hall et al. Other systems and/or couplers are also envisioned.

The present invention relates to the transmission of data along the axial length of conduit or pipe joints, such as WDPs, by way of one or more conductive wires. FIG. 5 illustrates a conduit 510 similar to the WDP joint shown in FIG. 2. Accordingly, conduit 510 is defined by a tubular body 502 equipped with a pair of communicative couplers 521, 531 at or near the respective box and pin ends 522, 532 of the tubular body. Conduit intended for downhole use, such as alloy steel drill pipe, typically consists of a straight pipe section (see tubular body 502) with a lower pin connection (see pin end 532) and an upper box connection (see box end 522). In the cased of a standard drill pipe, the inner diameter (ID) varies such that the smallest ID lies at the end connections (see $ID_1$) and the largest ID lies along the mid-axial portion of the pipe body (see $ID_2$). Typical differences between the end connection IDs and the pipe body IDs are 0.5 to 0.75 inches, but may be larger in some cases (e.g., 1.25 inches or more). It will be appreciated, however, that other downhole conduits (even some drill pipe) do not exhibit such a tapered ID but instead employ a constant ID through the end connections and the body. One example of a constant-ID drill pipe is Grant Prideco's HiTorgue™ drill pipe. The present invention is adaptive to downhole conduits having numerous (varied or constant) ID configurations.

The communicative couplers 521, 531 may be inductive coupler elements that each include a toroidal transformer (not shown), and are connected by one or more conductive wires 514 (also referred to herein simply as a "cable") for transmitting signals therebetween. The cable ends are typically routed through the "upset" ends of the conduit by way of a "gun-drilled" hole or machined groove in each of the upset ends so as to reach, e.g., the respective toroidal transformers. Thus, the communicative couplers 521, 531 and the cable 514 collectively provide a communicative link along each conduit 510 (e.g., along each WDP joint).

Particular utilities of the present invention include securing and protecting the electrically-conductive wires or pair of conductive wires (also known as conductors), such as cable 514, that run from one end of a joint of conduit to the other. If only one conductive wire is used, the conduit itself may serve as a second conductor to complete a circuit. Typically, at least two conductive wires will be employed, such as a twisted wire pair or coaxial cable configuration. At least one of the conductors must be electrically insulated from the other conductor(s). It may be desirable in some circumstances to use more than two conductors for redundancy or other purposes. Examples of such redundant wire routing are described below in reference to FIGS. 16A-B.

In one embodiment, the conductor(s) are secured and protected by an expandable tubular sleeve 550 shown disposed (and expanded) within the tubular body 502 of FIG. 5. The sleeve 550 is designed so that it will fit in its unexpanded state within the narrowest diameter, $ID_1$, of the conduit 510. Thus, e.g., the expandable tubular sleeve 550 may be initially cylindrical in shape and exhibit an outer diameter (OD) that is slightly narrower than the conduit ID at $ID_1$. It will be appreciated that the expandable tubular sleeve need not be initially cylindrical, and various configurations may be employed (e.g., U-shaped as described below) to advantage.

In particular embodiments, the expandable tubular sleeve has a portion that is predisposed to initiate expansion thereof under the application of internal fluid pressure, such as gas or fluid pressure, and particularly by way of hydroforming (described further below). When a sleeve such as sleeve 550 is disposed in a conduit 510, a cable 514—having been connected between the communicative couplers 521, 531 so as to establish a wired link—extends along the conduit's tubular body 502 between the inner wall of the tubular body and the (unexpanded) tubular sleeve 550. The tubular sleeve 550 is then expanded within the tubular body 502 by applying fluid pressure to the inner wall of the tubular sleeve, and the expansion is initiated at a predetermined location (e.g., at or near the center of the body 502). Such expansion has the effect of reliably securing the cable 514 between the tubular body 502 and the tubular sleeve 550.

FIGS. 6A-6D illustrate various means of preforming (i.e., forming prior to positioning the tubular sleeve within the tubular conduit body) an expandable sleeve like sleeve 550 of FIG. 5, so as to predispose a portion of the sleeve to initiate expansion thereof under the application of internal fluid pressure. In particular embodiments of the inventive method, the predisposed portion of the tubular sleeve is preformed by: localized application of mechanical force to the inner wall of the tubular sleeve (see expanded annular portion 652 of sleeve 650 in FIG. 6A); localized application of mechanical force to the outer wall of the tubular sleeve (see contracted annular portion 652' of sleeve 650' in FIG. 6B); reducing the wall thickness of a portion of the tubular sleeve (see thinned annular portion 652" of sleeve 650" in FIG. 6C); selectively reinforcing the tubular sleeve (see unreinforced annular portion 652''' of sleeve 650''' in FIG. 6D); modifying the material properties of a portion of the tubular sleeve (e.g., by localized heat treatment—not illustrated); or a combination of these.

A particular method of expanding the expandable tubular sleeve within a conduit such as a drill pipe uses high-pressure water in a known process called hydroforming, a hydraulic three-dimensional expansion process that may be conducted at ambient temperature to secure the sleeve within a conduit. The tubular body of the conduit may be held in a closed die assembly while the sleeve—disposed within the conduit—is charged with high-pressure (e.g., 5000-10,000 psig) hydraulic fluid such as water. A hydroforming setup may consist, e.g., of a plurality of sealing pistons and hydraulic pumps, as is generally known in the art. It may be desirable to axially feed the sleeve by applying a compressive pushing force (proportional to the hydraulic pressure, e.g., several thousand psig) to the ends while hydraulic pressure is applied to the ID of the sleeve.

The hydroforming process causes plastic expansion of the sleeve until the sleeve engages and conforms to the inner profile of the conduit (see, e.g., sleeve 550 within the ID of conduit body 502 of FIG. 5). Special metal-forming lubricants are used to minimize friction between sleeve OD and conduit ID. Once the hydraulic expansion is completed, excess sleeve material will extend axially beyond the two conduit ends, and will be trimmed to length.

Upon removal of the internal hydraulic pressure, the sleeve elastically contracts slightly within the conduit, thus leaving a small annular gap between the sleeve and the ID of the conduit. This gap may be filled with a polymer such as epoxy using a known vacuum-fill process. It could also be filled with a corrosion inhibitor such as a resin and/or a lubricant (e.g., oil or grease). The filler material minimizes the invasion of corrosive fluid into the annular gap. It also minimizes any relative movement of the sleeve inside the conduit.

The expandable tubular sleeve may have a thin-walled tubular body made of a metal or polymer, and exhibits a diameter slightly less than the smallest drill pipe ID to facilitate insertion of the sleeve into the conduit. The cable extends between the sleeve and inner wall of the conduit. In the case of a polymer sleeve, the cable may be embedded in the sleeve wall. With a metal sleeve, protective spacers (e.g., metal rods, or an elongated pad as described further below) are positioned near or about the cable to keep it from being crushed during expansion of the sleeve. In addition to protecting the cable, the expanded tubular sleeve may also protect the conduit (in particular, drill pipe) from corrosion, erosion, and other damage. The sleeve can in some cases eliminate the need for any drill pipe ID coating and therefore reduce overall cost.

One example of a drill pipe joint exhibits a 3.00 inch ID at the end connections and a 4.276 inch ID in the mid-section of the tubular sleeve body. With this geometry, a metal tubular sleeve needs to expand from an initial OD of just under 3.00 inches to an OD of 4.276 inches in order to fit the ID profile of the drill pipe. This results in nearly 43% expansion, and suggests the use of a ductile tubing material such as a fully annealed 304 stainless steel conduit (3.00" OD.times.0.065" wall thickness) for hydroforming. Such a sleeve may also be expected to undergo substantial elongation (e.g., 55-60%) during hydroforming.

The goal in the hydro-forming process is to achieve a final state of strain (at all points in the tube) in definable safe zones with sufficient margins of safety. Appropriate experimentation will indicate the level of sleeve wall thinning and the resulting margins of safety that can be achieved in a hydroforming process.

Figure 7:
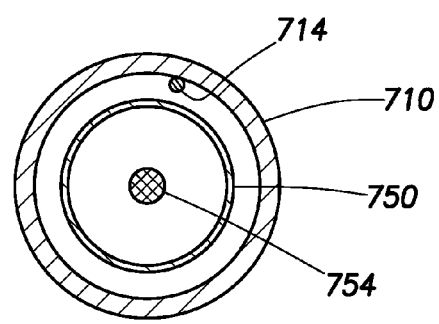
FIG. 7 illustrates an explosive being positioned within an expandable tubular sleeve like that of FIG. 5 for expanding the sleeve upon detonation.

With reference now to FIG. 7, another way of expanding a tubular sleeve, referenced as 750, to secure and protect a cable 714 within a conduit 710 employs an explosive charge 754. In a fashion similar to hydroforming, a relatively thin-walled sleeve 750 is placed inside a conduit such as drill pipe 710. Explosive charge(s) 754 are detonated inside the sleeve 750 causing it to rapidly expand and conform to the drill pipe ID. Metal spacers (not shown) may be employed to protect the cable 714 from damage during the explosion. Ideally, the sleeve will be metallurgically bonded to the drill pipe ID by the force of the explosive. However, to avoid damage to the cable 714, it is sufficient that the sleeve be expanded using a relatively small amount of explosive so that the liner will not bond to the drill pipe ID, but will nearly conform to the ID in size and shape (i.e., leaving a narrow, annular gap). As with the hydroformed sleeve, a resin or other protective material may be placed between the sleeve 750 and drill pipe 712 to fill any voids and ensure corrosion protection.

FIG. 8A is a sectional illustrations of a conduit 810 similar to the conduit 510 shown in FIG. 5, but employing an elongated pad 856 in combination with an expandable tubular sleeve 850 for securing one or more conductive wires (also known as a cable) 814 in accordance with the present invention. FIG. 8B is a perspective illustration of the conduit 810 of FIG. 8A, after the expandable tubular sleeve 850 has been expanded into engagement with the elongated pad 856 and the inner wall of the conduit 810. The tubular body 802 of the conduit 810 is equipped with a pair of communicative couplers 821, 831 at or near the respective box and pin ends 822, 832 of the tubular body 802. The elongated pad 856 is positioned at or near an inner wall of the tubular body 802 so as to protect and secure the cable 814 extending between the communicative couplers 821, 831 against the inner wall of the tubular body 802, thereby establishing a secured wired link. The elongated pad may be metallic in construction, permitting it to be bent to fit the ID profile of the conduit 810. Keyway features (not shown) machined on the connection end IDs of the conduit may be used to secure the pad therein. It will be appreciated that the pad may be otherwise secured to the conduit inner wall, such as by application of a suitable adhesive. When secured in this manner, the pad is prevented from moving during the expansion of the tubular sleeve 850.

Figure 9A:
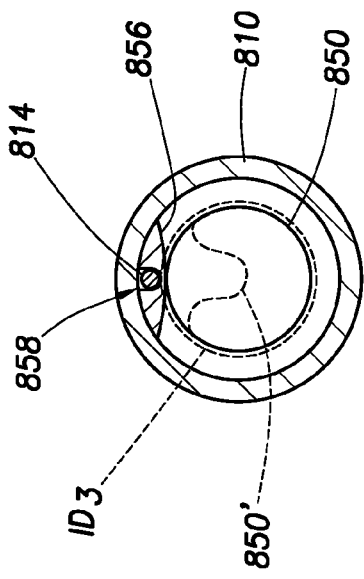
FIG. 9A is a cross-sectional illustration of the conduit of FIG. 8A, with an alternative U-shaped expandable tubular sleeve also being illustrated in dotted lines.
Figure 9B:
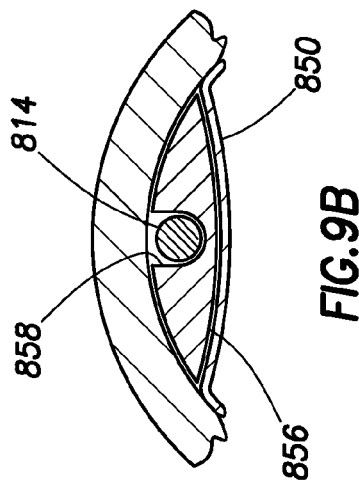
FIG. 9B is a detailed cross-sectional illustration of the conduit of FIG. 8B, wherein the sleeve has been expanded to engage the elongated pad and the inner wall of the conduit.

FIG. 9A is a cross-sectional illustration of the conduit 810, with the cylindrical expandable tubular sleeve 850 being shown in an unexpanded state and an alternative U-shaped expandable tubular sleeve 850' also being illustrated in dotted lines. The alternate sleeve 850' initially has a circular cross-section, and its diameter is close to the final expanded diameter inside the conduit 810 at the time the sleeve is inserted into the conduit 810. The sleeve 850' is preformed into the U-shape by partially collapsing the sleeve. In either case, the sleeve (e.g., 850 or 850') will have an OD that is slightly less than the minimum ID (referenced as $ID_3$) at the end connections of the conduit 810. FIG. 9B is a detailed cross-sectional illustration of a portion of the conduit 810, wherein the sleeve 850 has been expanded to engage the elongated pad 856 and the inner wall of the conduit body 802. The expanded sleeve along with the grooved metallic pad 856 secures the cable 814 that runs between the ends of the conduit (e.g., a drill pipe) 810 along the ID thereof. The groove 858 of the metallic pad 856 provides a smooth cable channel and protects the cable 814 from the expansion forces applied to the sleeve 850 as well as the downhole environment.

The tubular sleeve 850 may be expanded into engagement with the pad 856 and the conduit inner wall by applying fluid pressure to the inner wall of the sleeve (as described above in reference to the hydroforming of FIGS. 5-6), by mechanically applying force to the inner wall of the tubular sleeve (see FIG. 11C), or a combination of these steps. Additionally, the sleeve-expanding step may include detonating an explosive within the tubular sleeve so as to apply an explosive force to the inner wall of the tubular sleeve, as described above in reference to FIG. 7.

Figure 11C:
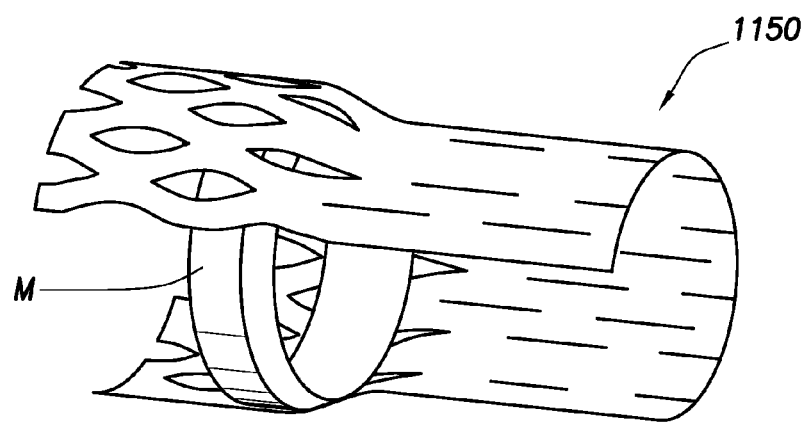
FIG. 11C shows a mandrel being used to mechanically expand the sleeve of FIG. 11A.
Figure 6A:
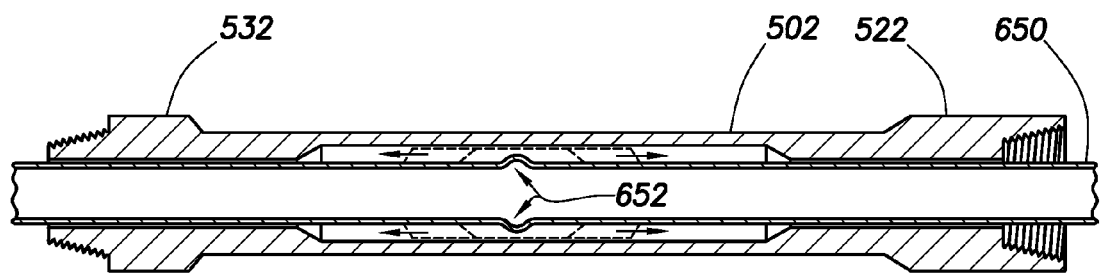
FIGS. 6A-6D illustrate various means of preforming the expandable sleeve of FIG. 5, so as to predispose a portion of the sleeve to initiate expansion thereof under the application of internal fluid pressure such as by hydroforming.
Figure 6B:
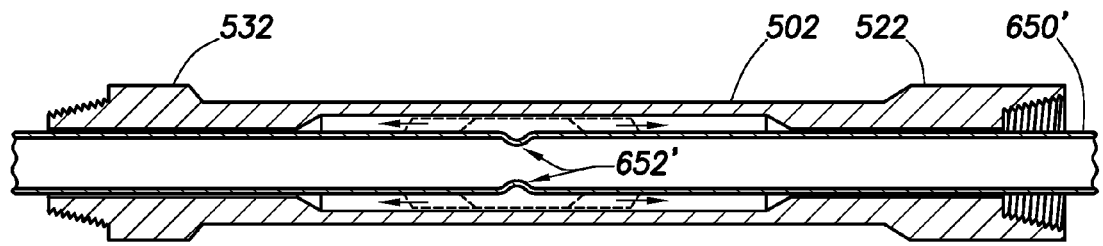
Figure 6C:
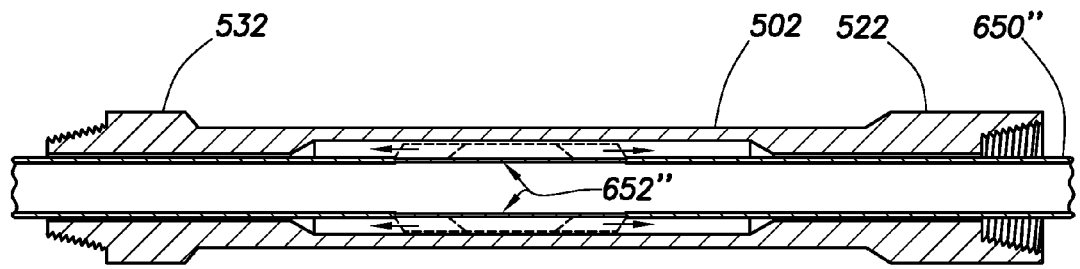
Figure 6D:
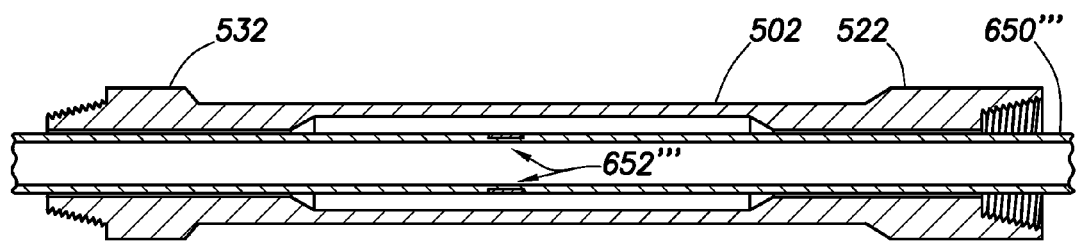

FIGS. 11A-B illustrate the expandable tubular sleeve 1150 being equipped with a plurality of axially-oriented slots 1162 therein to facilitate expansion of the sleeve. Thus, the tubular sleeve 1150 is inserted into the drill pipe or other conduit with the slots 1162 closed, as illustrated in FIG. 11A. A mechanical or hydraulic mandrel M (see FIG. 11C) is used to expand the sleeve 1150, which opens the slots 1162 as shown in FIG. 11B.

Referring again to FIGS. 8-9, the shape of the elongated pad 856 substantially defines a cylindrical segment having an outer arcuate surface that complements the inner wall of the conduit body 802 (i.e., the elongated pad 856 is crescent-shaped) to reduce the maximum strain experienced in the sleeve 850. An elongated groove 858 is formed in the outer arcuate surface of the pad 856 for receiving the one or more conductive wires (i.e., a cable) 814. As mentioned above, the pad 856 is secured to the ID of the conduit 810 prior to expansion of the sleeve 850, such as by gluing the pad 856 to the conduit inner wall to ensure that it won't move during expansion of the sleeve. In the case of a metallic pad, however, the pad may be pre-formed to conform to the ID profile of the conduit (e.g., drill pipe), which also tends to keep the pad in place during the sleeve expansion process. The conduit 810 may employ a slot/keyway feature (not shown) on its ID at or near the end connections to route the cable 814 from the wire channel 858 of the pad 856 to gun-drilled openings or grooves (not shown) at the conduit ends 822, 832.

Figure 10A:
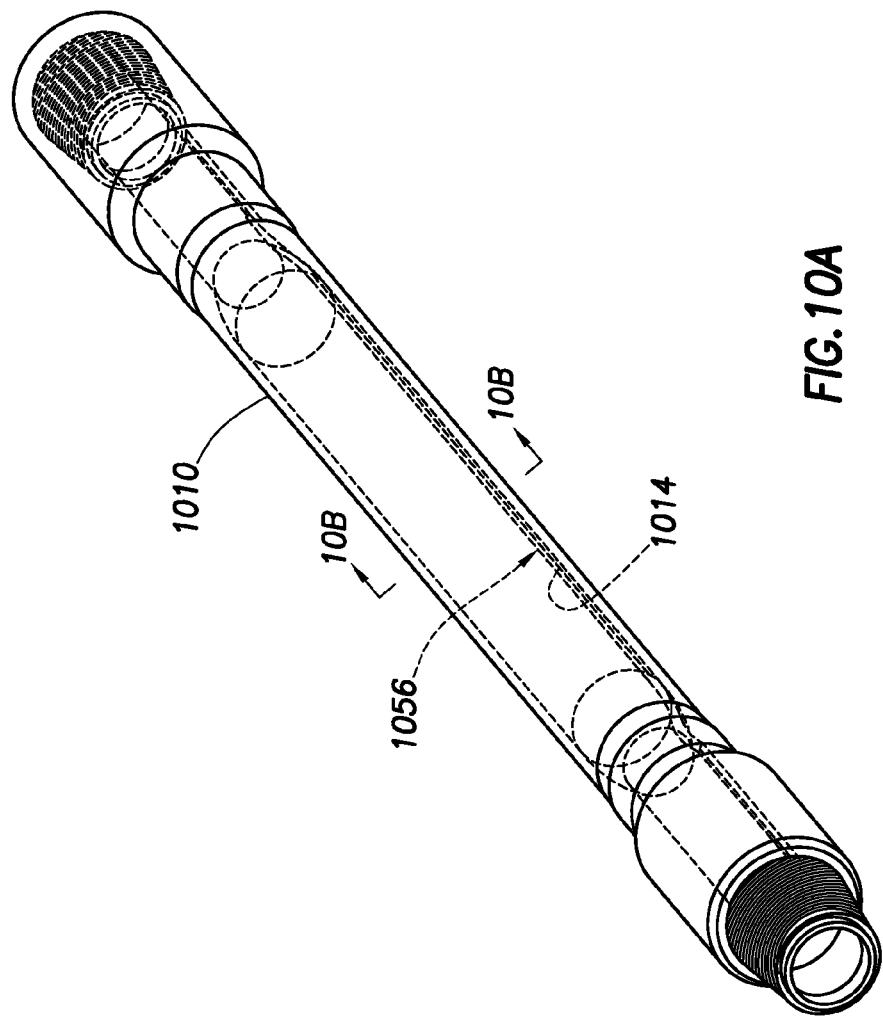
FIG. 10A illustrates a conduit similar to that shown in FIG. 5, but employing a welded, grooved elongated pad for securing one or more conductive wires in accordance with the present invention.
Figure 10B:
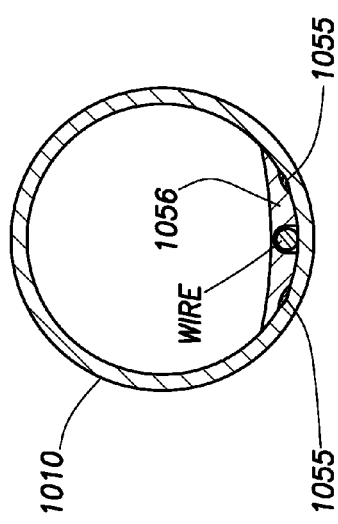
FIG. 10B is a cross-sectional illustration of the conduit of FIG. 10A, taken along section line 10B-10B of FIG. 10A.

With reference now to FIGS. 10A-B, it will be appreciated that an elongated pad such as pad 1056 may be substantially metallic, polymeric, composite, fiberglass, ceramic, or a combination thereof. In particular embodiments wherein the pad is metallic, the pad 1056 may be secured to the inner wall of the conduit 1010 by welding the pad thereto at one or more locations 1055 (see FIG. 10B) along the pad 1056. In such a welded configuration, no expandable sleeve is needed to secure/protect the pad 1056 within the conduit 1010. The pad 1056 may be attached to the conduit inner wall by intermittent (e.g., tac-weld) or continuous welds. The pad may be configured in various ways, such as a helix, a straight line or sinusoidal undulations. A robotic welding fixture could be used to reach, e.g., the middle of a thirty foot joint of drill pipe. The drill pipe's (or other conduit's) inner wall is employed as part of the wire passageway, effectively increasing the diametric clearance of the drill pipe and possibly reducing problems with erosion, mudflow pressure drop and obstruction to logging tools, etc. This design thus employs a grooved metallic pad or strip that follows the ID profile of a drill pipe. Wires installed in this grooved metallic strip are routed to grooves at the respective conduit ends through holes drilled in the end connections.

Figure 12:
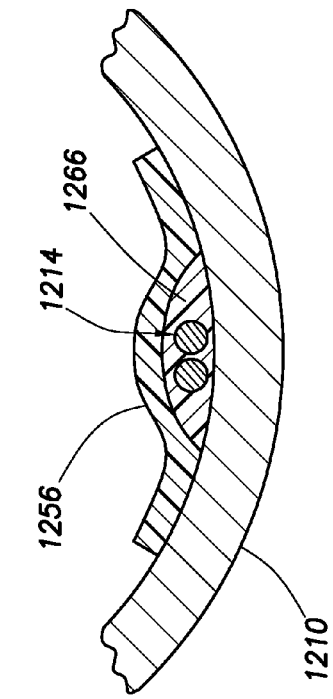
FIG. 12 is a detailed cross-sectional illustration similar to that of FIG. 9B, but wherein an elongated pad is employed independently of an expandable tubular sleeve and is bonded to the inner wall of a conduit.
Figure 13B:
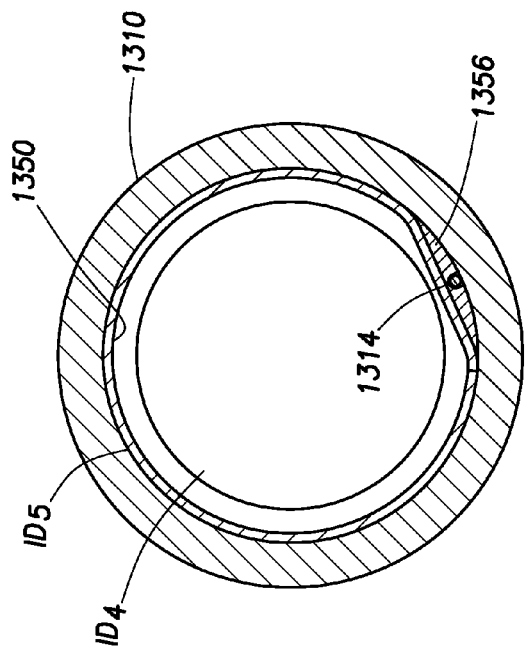
FIGS. 13A-B are cross-sectional illustrations of an alternative expandable tubular sleeve, in respective contracted and expanded states, employed to secure an elongated pad in accordance with the present invention.
Figure 13A:
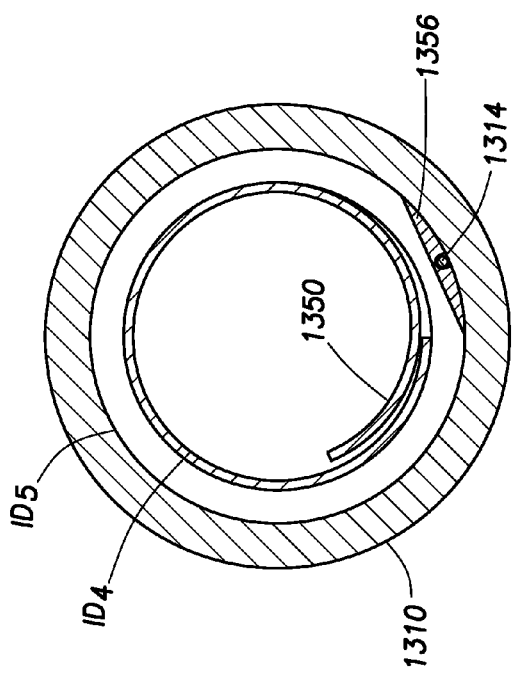

In further embodiments wherein the pad is fiberglass, as illustrated by pad 1256 in FIG. 12, the pad is secured to the conduit 1210 by bonding the pad 1256 to the inner wall of the conduit's tubular body with an epoxy 1266 such as that commonly applied for corrosion protection. Additionally, the one or more conductive wires that make up the cable 1214 may be bonded to the inner wall of the tubular body, e.g., using the same epoxy 1266. The fiberglass pad 1256 aids adherence of the cable 1214 by providing a porous fabric to maximize contact area with the epoxy and ensure a reliable bond. The fiberglass pad also protects the cable from erosion, abrasion and other mechanical damage, even if the epoxy coating chips off FIGS. 13A-B are cross-sectional illustrations of an alternative expandable tubular sleeve 1350, in respective contracted and expanded states. The sleeve 1350 is employed to secure an elongated pad 1356 within a conduit 1310 in accordance with the present invention. The tubular sleeve 1350 is cut along its length (e.g., axially or spirally), with the tubular sleeve having a diameter before such cutting that prevents it from fitting within the smallest ID, referenced as $ID_4$, of the conduit 1310. A compressive force is applied to the cut tubular sleeve 1350 to radially collapse the tubular sleeve into a spiral shape so that it will fit within the minimum clearance $ID_4$ at the end connections of the tubular body of the conduit 1310. While the tubular sleeve 1350 is maintained in the collapsed state, it is positioned within the conduit 1310, as illustrated in FIG. 13A. Accordingly, the elongated pad 1356 is positioned between the conduit 1310 and the tubular sleeve 1350. The tubular sleeve 1350 is then released (and possibly forced open) from its collapsed state so that the tubular sleeve radially expands into engagement with the elongated pad 1356 and the tubular body of the conduit 1310, as illustrated in FIG. 13B. In this position, at least a portion of the sleeve 1350 will expand into the larger ID, referenced at $ID_5$, of the intermediate body portion of the conduit 1310. Support rings can be added to the interior of the opened tubular sleeve to provide additional strength, and may be tack-welded in place.

Figure 14A:
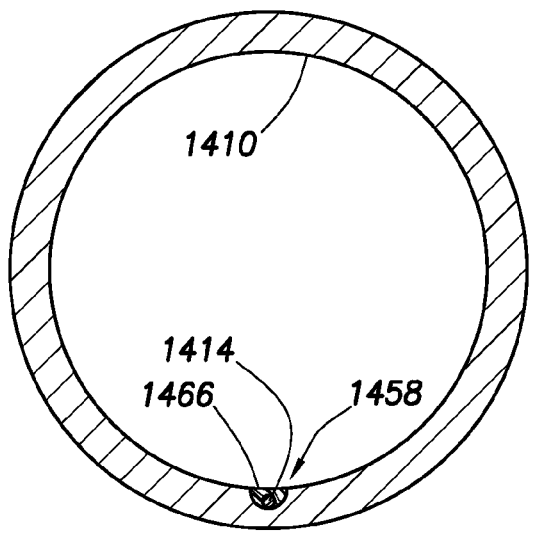
FIG. 14A is a cross-sectional illustration of a conduit employing a groove in its inner wall for securing one or more conductive wires in accordance with the present invention.

FIG. 14A is a cross-sectional illustration of a conduit 1410 employing one or more inner grooves 1458 in its inner wall for protecting and securing a cable 1414 in accordance with the present invention. The conduit 1410 is equipped with a communicative coupler (not shown) at or near each of the two ends of the conduit's tubular body. The inner groove 1458 is formed in the inner wall of the conduit's tubular body by machining or, preferably, during the pipe extrusion process. The groove 1458 extends substantially between the conduit's communicative couplers. A cable 1414 having one or more conductive wires is extended through the groove 1458. The cable 1414 is connected between the communicative couplers, in a manner similar to that described above for other embodiments, so as to establish one or more wired links. The cable 1414 is secured within the inner groove 1458 by potting 1466.

Figure 14B:
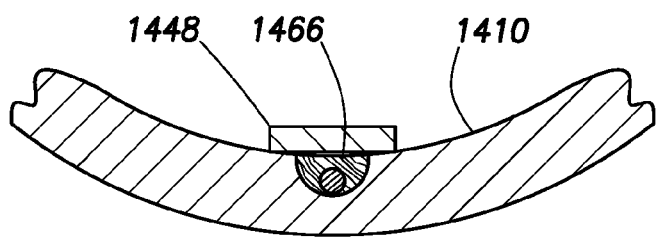
FIG. 14B illustrates the grooved conduit of FIG. 14A equipped with a cover plate.

The groove 1458 may otherwise include one or more plates 1448 bonded to the inner wall of the conduit tubular body, as shown in FIG. 14B, so as to cover each of the one or more grooves independently. The cover strip 1448 may be bonded to the drill pipe or other conduit 1410 using conventional welding methods or by explosive forming techniques. An epoxy coating is often applied to the pipe ID for corrosion protection, and may also serve to protect the wires in a groove. The cable 1414 may otherwise be secured by extending the cable through one or more small second conduits each bonded to or within one of the groove(s), with each second conduit being shaped and oriented so that it extends substantially between the communicative couplers (not shown in FIGS. 14A-B).

Figure 15:
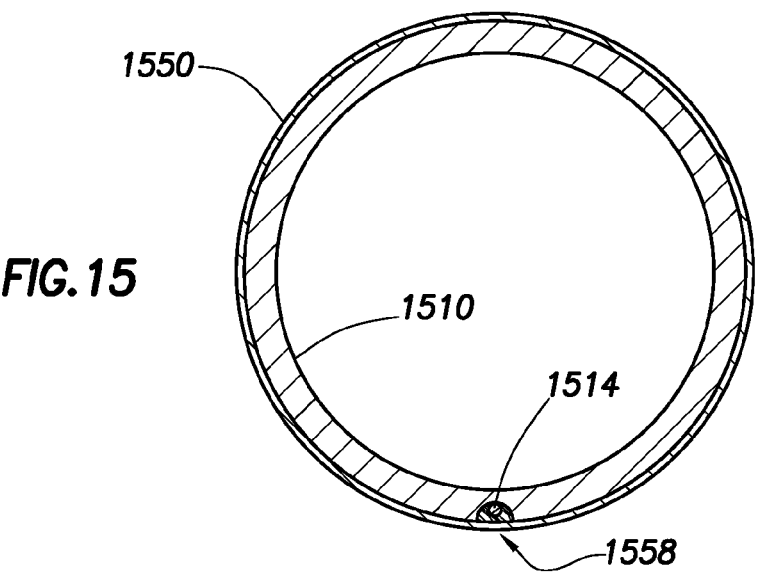
FIG. 15 is a cross-sectional illustration of a conduit employing a groove in its outer wall and an outer liner for securing one or more conductive wires in accordance with the present invention.

FIG. 15 is a cross-sectional illustration of a conduit 1510 employing one or more grooves 1558 in its outer wall and an outer liner/sleeve 1550 for protecting and securing a cable 1514 having one or more conductive wires within the groove(s) 1558 in accordance with the present invention. The cable 1514 may be potted within the groove(s), and may otherwise be covered within the groove(s) such as by securing a sleeve 1550 about the outer wall of the conduit 1510. Such a sleeve 1550 may be one of metallic, polymeric, composite, fiberglass, ceramic or a combination thereof.

It will be appreciated by those having ordinary skill in the art that the wired conduits described herein are well-adapted for integration in a drill string as a telemetry system of interconnected WDPs for transmitting signals in a borehole environment. Each of the conduits includes a tubular body equipped with a communicative coupler at or near each of the two ends of the tubular body, with the communicative couplers permitting signals to be transmitted between adjacent, interconnected conduits. In particular versions of such a system, e.g., an elongated pad and/or expandable tubular sleeve is positioned along an inner wall of the tubular conduit body, and one or more conductive wires extend along the pad/sleeve such that the one or more wires are disposed between the inner wall of the tubular body and at least a portion of the pad/sleeve. The one or more wires, also referred to herein as a cable, are connected between the communicative couplers so as to establish a wired link.

It will no doubt be further appreciated that the present invention facilitates certain efficiencies in manufacturing. Drill pipe, e.g., is typically manufactured in three separate pieces that are welded together. The center piece (tubular body) is a simple steel tube which is upset on either end by a forging operation. The end pieces (tool joints or end connections) start as forged steel shapes on which threads and other features are machined before they are friction welded to the tubular body.

The modifications described herein with respect to a normal conduit, in particular a drill pipe, can generally be implemented after the drill pipe has been completely manufactured. However, certain operations would be much easier if they were done during fabrication. For example, the wire passages (e.g., gun-drilled holes) from the transformer coils to the tubular pipe body could be machined at the same time as the threads and shoulders of the pipe joints. Likewise, grooves and other features could be added to the body before the friction welding operation that joins the tool joints to the tubular body, when the pipe body ID is more accessible.

Many of the methods described in the preceding sections could otherwise be advantageously incorporated into the manufacturing process, and, in some instances, according to different temporal execution of the method steps. For example, the wire-routing features could be built into the long middle section of a drill pipe prior to any upsetting and/or welding steps. Building wire-routing features in a drill pipe having a uniform ID is much simpler than conducting the same in a finished drill pipe that typically has smaller ID at the ends. Once the middle section is fitted with the wire-routing features, it can then be subjected to known up-setting and welding operations. The following construction scheme provides a built-in wire-routing feature that spans nearly 80% of the finished drill pipe length (e.g., 25 feet out of 30).

First, the metal or polymer tubular sleeve could be hydro-formed inside the body before the upset operation. Since the internal diameter would be more uniform, the amount of expansion would be greatly reduced, simplifying the operation and improving the conformance. A separate routing method would be used to convey the wiring from the tool joint and past the friction weld.

Likewise, a metal sleeve could be explosion-formed inside the tubular body of the conduit before friction welding. Additionally, it may be possible to metallurgically bond the sleeve to the pipe, facilitating the upsetting process. Similarly, the metal pad could be welded in place more easily before friction welding.

Additionally, inner/outer grooves for containing the cable could be extruded, formed or machined in the tubular pipe body before the body is upset and welded. In particular, an extruded or formed groove would be much less expensive than machining, and it would be stronger and for resistant to fatigue.

Figure 16A:
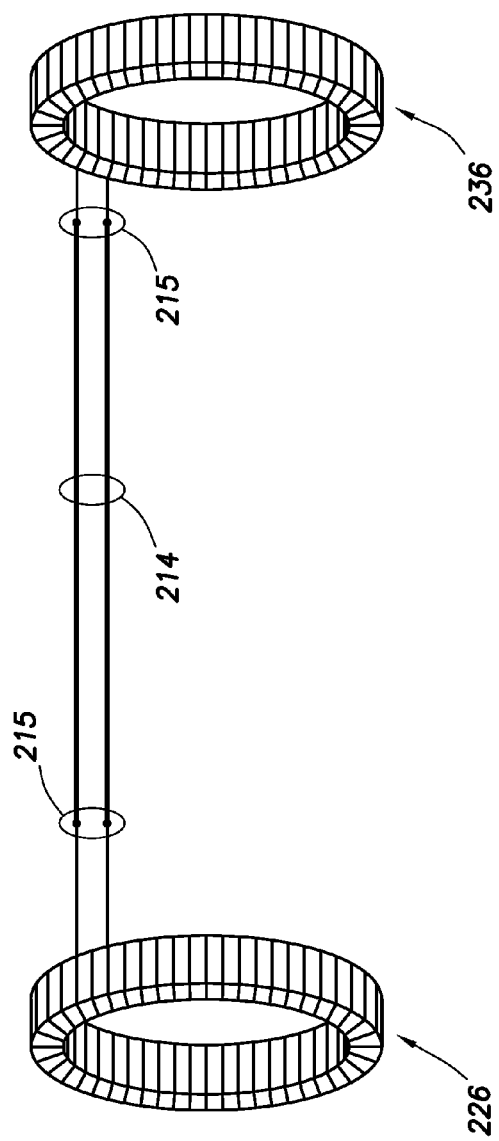
FIG. 16A schematically illustrates a wired link according to the conduits of FIGS. 2-4.

Other manufacturing modifications relate to the ability of the inventive wired conduits to withstand wiring faults or other failures. FIG. 16A schematically illustrates a wired link according to the conduits (e.g., WDPs) of FIGS. 2-4. Thus, a pair of opposing toroidal transformers 226, 236 (components of respective communicative couplers) are interconnected by a cable 214 having a pair of insulated conducting wires that are routed within the tubular body of a conduit. Each toroidal transformer employs a core material having high magnetic permeability (e.g., Supermalloy), and is wrapped with N turns of insulated wire (N.about.100 to 200 turns). The insulated wire is uniformly coiled around the circumference of the toroidal core to form the transformer coils (not separately numbered). Four insulated soldered, welded or crimped connections or connectors 215 are utilized to join the wires of the cable 214 with the respective coils of the transformers 226, 236.

Reliability is critical for such WDP joints. If any wire in such a joint breaks, then the entire WDP system that employs the failing WDP joint also fails. There are several failure modes that might occur. For example, "cold solder joints" are not uncommon—where solder does not bond correctly to both wires. These can be intermittently open and then fail in the open condition. Prolonged vibration can cause wires to fatigue and break if they are not rigidly secured. Thermal expansion, shock, or debris might damage or cut the wire used to wrap the toroidal core.

Figure 16B:
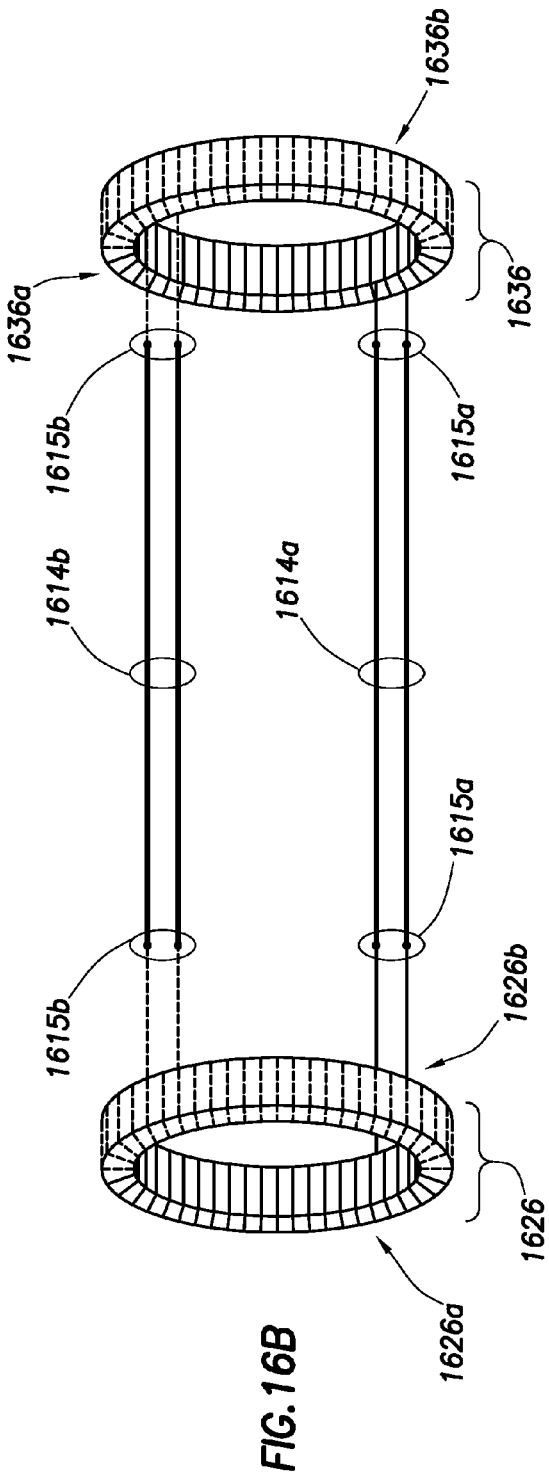
FIG. 16B schematically illustrates a pair of independent wired links for employment by a conduit in accordance with the present invention.

FIG. 16B schematically illustrates a pair of independent wired links for employment by a conduit such as a WDP joint in accordance with the present invention. Thus, a pair of opposing toroidal transformers 1626, 1636 each includes a coil system having two independent coil windings, with each coil winding lying substantially within a 180.degree. arc of the coil system. More particularly, toroidal transformer 1626 has a first coil winding 1626a and a second coil winding 1626b, each of which is independently and uniformly coiled about half the circumference of the toroidal core of transformer 1626. Similarly, toroidal transformer 1636 has a first coil winding 1626a and a second coil winding 1626b, each of which is independently and uniformly coiled about half the circumference of the toroidal core of transformer 1636. A pair of insulated conducting wires, referred to as cable 1614a, extend between and are connected at respective ends thereof to the coil windings 1626a, 1626a by way of four insulated solder joints 1615a. Similarly, a pair of insulated conducting wires, referred to as cable 1614b, extend between and are connected at respective ends thereof to the coil windings 1626b, 1626b by way of four insulated solder joints 1615b. Cable 1614a is routed independently of cable 1614b (meaning separate electrical pathways, but not necessarily remote routing locations within a WDP) so that the cables and their respective interconnected coil windings establish two independently-wired links.

It will be appreciated that WDP reliability can be improved by using a double wrap (or other multiple wrap) configuration as shown in FIG. 16B. In this design, there is a second, redundant circuit. Each toroidal core is wrapped with two separate coil windings (indicated by the dotted and dashed lines). In a particular embodiment, each winding has the same number of turns (M). However, the two wraps could have a different number of turns and still provide most of the benefits of redundancy. If M=N, then the electromagnetic properties of the new design are essentially the same as the previous design.

Because the two circuits are in parallel, if one circuit fails, the other circuit can still carry the telemetry signal. Furthermore, the characteristic impedance of the transmission line will not change significantly, so that such a failure will not increase the attenuation. The series resistance of the connecting wires will increase in this section of drill pipe if one circuit has failed, but the series resistance of the connecting wires does not dominate the transmission loss anyway. The leakage flux from the toroidal core will also increase slightly if one circuit fails, but this will have a minor effect as well. Because the cores' magnetic permeability is very large, most of the flux from the one winding will still remain in the core.

Uncorrelated failures should be significantly reduced. For example, suppose that cold solder joints are uncorrelated with an occurrence rate of $10^{-3}$ per soldering operation. Assume 660 drill pipes (20,000 ft) with a single circuit and four solder joints/drill pipe. The number of cold solder joints for this system is then $(10^{-3})(660)(4) \approx 3$. If only one of these cold solder joints fail during a bit run, the WDP system will fail. Now consider WDP with the redundant, second circuit. Each drill pipe now has 8 solder joints, so a 20,000 ft drill string will have $(10^{-3})(660)(8) \approx 6$ cold solder joints. However if one of these solder joints fails, then the second circuit continues to carry the signal. The odds of the second circuit failing due to a cold solder joint is now $\approx 10^{-3}$.

Another type of failure may result if a stone or other small object comes into contact with a coil winding and crushes or cuts the wire. If each of the two windings lie substantially within a 180.degree. arc on opposite halves of the toroidal transformer, then the chances that both windings will be damaged is greatly reduced. Physically separating the two windings is thus preferable, but it is also possible to intersperse the two windings so that each occupies 360.degree. of the toroidal core.

If the two circuits are routed on two different paths along the drill pipe between the toroidal transformers, the chances of both circuits being damaged simultaneously is further reduced. For example, if there are any sharp edges in the channels that carry the wires along the drill pipe, then shock and vibration may cause the wires to rub against such sharp edges and be cut. Such sharp edges might result from an incomplete deburring of the mechanical parts during manufacturing.

It will be understood from the foregoing description that various modifications and changes may be made in the preferred and alternative embodiments of the present invention without departing from its true spirit. For example, in the independent wired link aspect of the present invention, three or more circuits could be employed in wired drill pipes for a greater degree of redundancy. In this case, each winding would lie substantially within a 120.degree. arc of the toroidal transformer. Thus, even if two circuits failed in one drill pipe, the third circuit would still carry the signal.

Other types of inductive couplings would also benefit from redundant circuits. For example, known WDP systems employ inductive couplers at each end of a drill pipe, with each coupler comprising one or more wire loops within magnetic cores. However, such systems contain only one circuit per drill pipe. According to the independent wired link aspect of the present invention, two or more independent circuits could be used, wherein each circuit consisted of one loop of wire per coupler and the connecting wires between the two couplers.

It will be further appreciated by those having ordinary skill in the art that the present invention, according to its various aspects and embodiments, will not be limited to WDP applications. Thus, e.g., the wired links and related aspects of the present invention may be applied to advantage in downhole tubing, casing, etc. that is not used for drilling. One such application would relate to permanent subsurface installations that employed sensors for monitoring various formation parameters over time. Accordingly, the present invention could be employed in such permanent monitoring applications for achieving communication between the surface and permanent subsurface sensors.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open set or group.

Similarly, the terms "containing," "having," and "including" are all intended to mean an open set or group of elements. "A," "an" and other singular terms are intended to include the plural forms thereof unless specifically excluded. Additionally, the method claims are not to be limited by the order or sequence in which the steps of such claims are presented. Thus, e.g., a first-recited step of a method claim does not necessarily have to be executed prior to a second-recited step of that claim.

What is claimed is:

1. A method for making a conduit for transmitting signals along its length, comprising the steps of:
    equipping a tubular body with a communicative coupler at or near an end of the tubular body;
    forming one or more grooves in an inner wall of the tubular body that extend substantially to the communicative coupler;
    extending one or more conductive wires through the one or more grooves;
    putting the one or more conductive wires in signal communication with the communicative coupler so as to establish one or more wired links;

securing the one or more conductive wires within the one or more grooves; and securing one or more plates to the inner wall of the tubular body so as to cover each of the grooves independently.

2. The method of claim 1, wherein the securing the one or more conductive wires comprises bonding the one or more wires within the one or more grooves.

3. The method of claim 1, wherein the securing the one or more conductive wires comprises extending the one or more wires through one or more second conduits each bonded to one of the grooves, each second conduit being shaped and oriented so that it extends substantially to the communicative coupler.

4. A conduit for transmitting signals along its length in a borehole environment, comprising:

a tubular body equipped with a communicative coupler at or near one of its ends, the tubular body having one or more grooves in an inner wall thereof that extend substantially to the communicative coupler; and one or more conductive wires extending through and being secured within the one or more grooves, the one or more conductive wires in signal communication with the communicative coupler so as to establish one or more wired links;

wherein each of the one or more grooves are covered by one or more plates secured to the inner wall of the tubular body so as to cover each of the grooves independently.

5. The conduit of claim 4, wherein the one or more wires are secured within the one or more grooves by bonding.

6. The conduit of claim 4, wherein the one or more wires are secured by extending the one or more wires through one or more second conduits each bonded to one of the grooves, each second conduit being shaped and oriented so that it extends substantially to the communicative coupler.

* * * * *